(12) United States Patent
Samuelsson et al.

(10) Patent No.: US 9,692,533 B2
(45) Date of Patent: Jun. 27, 2017

(54) OPERATING A USER EQUIPMENT IN A WIRELESS COMMUNICATION NETWORK

(71) Applicant: Sony Corporation, Tokyo (JP)

(72) Inventors: Vanja Plicanic Samuelsson, Lund (SE); Rickard Ljung, Helsingborg (SE); Lars Nord, Lund (SE); Anders Berggren, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 77 days.

(21) Appl. No.: 14/310,221

(22) Filed: Jun. 20, 2014

(65) Prior Publication Data

US 2015/0372774 A1    Dec. 24, 2015

(51) Int. Cl.
| | | |
|---|---|---|
| H04M 11/04 | (2006.01) |
| H04H 20/59 | (2008.01) |
| H04W 76/02 | (2009.01) |
| H04W 8/00 | (2009.01) |
| H04H 20/72 | (2008.01) |
| H04W 4/00 | (2009.01) |
| H04W 4/06 | (2009.01) |
| H04W 4/22 | (2009.01) |

(52) U.S. Cl.
CPC ............ *H04H 20/59* (2013.01); *H04H 20/72* (2013.01); *H04W 4/008* (2013.01); *H04W 4/06* (2013.01); *H04W 4/22* (2013.01); *H04W 8/005* (2013.01); *H04W 76/023* (2013.01)

(58) Field of Classification Search
CPC ....... H04W 4/22; H04W 76/007; H04W 4/06; H04W 4/12; H04W 48/10; H04W 4/021; H04W 56/00; H04W 72/1226; H04W 76/002
USPC ........... 455/404.1, 3.01, 404.2, 422.1, 426.1, 455/452.1, 456.3, 521; 370/254, 312, 313
See application file for complete search history.

(56) References Cited

U.S. PATENT DOCUMENTS

| | | | |
|---|---|---|---|
| 8,107,397 B1 | 1/2012 | Bagchi et al. | |
| 2013/0273907 A1* | 10/2013 | Vikberg | H04W 48/02 455/426.1 |
| 2014/0315511 A1* | 10/2014 | Cha | H04W 4/06 455/404.1 |

FOREIGN PATENT DOCUMENTS

WO    WO 2014/072321 A1    5/2014

OTHER PUBLICATIONS

International Search Report and Written Opinion of the International Searching Authority, PCT Application No. PCT/EP2014/077536, Feb. 19, 2015.

* cited by examiner

*Primary Examiner* — Shaima Q Aminzay
(74) *Attorney, Agent, or Firm* — Myers Bigel, P.A.

(57) ABSTRACT

A method for operating a user equipment in a wireless communication network and a user equipment are described.

16 Claims, 2 Drawing Sheets

OPERATING A USER EQUIPMENT IN A WIRELESS COMMUNICATION NETWORK

FIELD OF THE INVENTION

The present invention relates to a method for operating a user equipment in a wireless communication network, especially to a method for operating the user equipment in case of an emergency, when the user equipment has received a warning from a public warning system. The present invention relates furthermore to a user equipment implementing the method.

BACKGROUND OF THE INVENTION

Public Warning Systems (PWS,) like for example an earthquake and tsunami warning system (ETWS) or a commercial mobile alert system (CMAS), have been standardized by the Third Generation Partnership Project (3GPP) and have been deployed at several locations around the world. The purpose of a public warning system is to warn people of possible catastrophic situations by alerting mobile devices, for example user equipments like mobile phones, via paging and distributing warning information via for example a system information in Long Term evolution (LTE) systems or via a cell broad-cast (CBS) in Global Systems for Mobile communications (GSM) and Universal Mobile Telecommunication Systems (UMTS). Furthermore, mobile devices in connected mode may be alerted via a dedicated signalling. Examples of such catastrophic situations may be tsunamis, earthquakes, hurricanes and so on.

The public warning systems are designed to effectively reach as much mobile devices as possible within a short period of time, e.g. around a view minutes in total or even only within seconds in the operator network. This may be accomplished by broadcasting warning notifications to multiple mobile devices simultaneously with no requirements on acknowledgement as defined for example in 3GPP TS 22.268.

However, in case of a catastrophic situation, when public warning is issued by the public warning systems, parts of the mobile network may be dysfunctional resulting in a number of mobile devices which are unreachable, as some base stations may have collapsed from physical damage or power shortage from for example an earthquake.

Therefore, there is a need to improve warning people in such situations.

SUMMARY OF THE INVENTION

According to an embodiment, a method for operating a user equipment in a wireless communication network is provided. The user equipment comprises a first communication unit for communicating with the wireless communication network, for example with a base station of the communication network, and a second communication unit for communicating directly with another user equipment within a transmission range of the user equipment via a device-to-device communication. According to the method, a first warning indication is received at the user equipment, and a warning information is determined based on the first warning indication. A second warning indication which comprises the warning information is sent via the device-to-device communication to the other user equipment.

The warning information may be sent to the user equipment via a notification defined in the wireless communication network. The notification may contain the warning indication only such that the user equipment is triggered by the warning indication to retrieve the warning information, or the notification may comprise the warning information. Furthermore, the warning information may be sent to the user equipment in a further notification. However, the warning indication indicates that warning information is available and the warning information may give more detailed information in a direct or coded form to inform a user of the user equipment about the warning.

For example, in 3GPP a feature of proximity based services (ProSe) by means of device-to-device communication (D2D) is about to be standardized. The purpose of ProSe/D2D is to enable direct communication between user equipment in proximity. With the above-described method, this can be effectively used for public safety when a user equipment is out of network coverage. Network coverage may be reduced in case of a catastrophic situation like an earthquake, when parts of the mobile communication network are broken. In this case, the user equipments may communicate directly with each other for forwarding warning indications and warning information instead of communicating via the communication network.

In other words, in order to propagate or relay public warning information from the mobile communication network to a user equipment which is out of coverage of the mobile communication network, but which is reachable via a device-to-device communication, any user equipment with device-to-device capability should, when receiving a public warning information from the network, relay this information via device-to-device communication to the user equipments out of coverage.

According to an embodiment, sending the second warning indication via the device-to-device communication comprises for example broadcasting the warning indication, multicasting the warning information or transmitting the warning indication via a device-to-device transmission connection established between the user equipment and the other user equipment. Multicasting the warning indication may comprise for example a so-called one-to-many broadcast. Broadcasting the warning indication may be accomplished for example by adding information to a generic signal, e.g. a device-to-device synchronisation signal (D2DSS).

According to another embodiment, the first warning indication may be received from a public warning system of the wireless communication network, for example from a server of a public warning system communicating with a base station of the wireless communication network. Additionally or as an alternative, the first warning indication may be received via device-to-device communication from a further user equipment. Thus, the warning indication and the warning information may be relayed from user equipment to user equipment thereby spanning large areas with no network coverage.

According to another embodiment, the first warning notification comprises the warning information and therefore the warning information is extracted from the warning notification to be forwarded within the second warning notification. For example, the warning information may be comprised in a system information or in a cell broadcast message in for example a GSM or UMTS system.

According to another embodiment, determining the warning information is accomplished by retrieving the warning information from a public warning system of the wireless communication network upon receiving the warning indication. For example, the user equipment may receive the warning indication as a public warning notification from a public warning system (PWS), for example an ETWS or CMAS, via paging or system information broadcast. Upon receiving the public warning notification, the user equipment may retrieve the detailed warning information by reading system information in an LTE system, or via cell broadcast in GSM/UMTS.

According to another embodiment, the method may comprise furthermore the following steps. The warning information is stored in a storage unit of the user equipment and a third warning indication is received at the user equipment after the user equipment has received the first warning indication. A further warning information is determined based on the third warning indication and the warning information of the first warning indication is compared with the further warning information of the third warning indication. A fourth warning indication comprising the further warning information is sent via the device-to-device communication to the other user equipment based on the comparison. For example, the user equipment may only send the fourth warning indication, if the warning information and the further warning information are different, such that the user equipment does not relay the same warning information more than once. When a warning indication is forwarded via a device-to-device communication from one user equipment to a next user equipment, this may result in loops such that the same warning indication is forwarded by the same user equipments several times and this may flood the user equipments with a lot of warning indications indicating all the same. To avoid this, according to the above-described embodiment, the warning information may be forwarded only after being compared to the previously sent warning information.

According to a further embodiment, a time of reception of the first warning indication is stored in the user equipment and a time of reception of the third warning indication is compared with the time of reception of the first warning indication. The fourth warning indication is sent to the other user equipment via the device to device communication based on the time comparison. For example, the behaviour of relaying warning information from the public warning system may continue for a specified time period only to avoid flooding the user equipments with the same warning information again and again. The maximum time for which the warning information is forwarded by the user equipment may be set to a few seconds or a few minutes, for example to one minute.

According to another embodiment, in case the warning information is the same as the further warning information, the number of times the same warning information is sent is counted and a further sending of the same warning information is inhibited depending on the counted number. In other words the maximum amount of forwarding occasions of the same warning information may be limited, thus preventing to flood the user equipments with the same warning information again and again.

According a further embodiment an age of the warning information is determined. The age indicates a time period between the first time the warning information was indicated by the wireless communication network and the time the warning information was determined by the user equipment based on the first warning indication. E.g., when a specific warning is issue the first time by the wireless communication network, a time stamp may be added to the warning information. Upon receiving the first warning indication the user equipment determines the warning information and extracts the time, stamp. Then, the user equipment may compare the time stamp with the current time and may determine the age of the warning information. The second warning indication is sent via the device-to-device communication to the other user equipment based on the age. For example, the second warning indication may only be sent, if the warning information is younger than 30 minutes or an hour. Thus, obsolete warnings may not be forwarded.

According to yet another embodiment, a hop counter value of the warning information is determined. The hop counter value indicates a number of times the warning information has been sent via the device-to-device communication to a further user equipment. When the warning information is issued the first time in the wireless communication network, the hop counter value may be set to a predefined value in a range of for example 10 to 1000. Every time the warning information is forwarded, the hop counter value may be decreased by one. A further sending of the warning information is inhibited depending on the hop number counter, for example only as long as the hop counter value is above zero. Therefore, the number of times the same warning information is forwarded may be limited.

According to another embodiment, the method comprises furthermore determining, if a communication connection between the user equipment and the communication network is present, and determining, if the first warning indication has been received from a further user equipment via a device-to-device communication. If the communication connection between the user equipment and the communication network is present and if the first warning indication has been received from the further user equipment, sending of the second warning indication via the device-to-device communication is inhibited. In other words, if the user equipment is in coverage of the communication network and receives a relayed warning indication from the further user equipment via a device-to-device communication, then the user equipment will not forward the warning indication. This may minimize unwanted looping of the warning indications. In case the user equipment has no communication connection to the communication network or has received the warning information from the communication network, the user equipment may forward the warning indication.

According to another embodiment, receiving the first warning indication comprises receiving a system information block (SIB) which comprises the first warning indication. According to another embodiment, receiving the first warning indication comprises receiving the first warning indication as a part of a synchronization signal.

According to another embodiment, a user equipment is provided. The user equipment comprises a first communication unit for communicating with a communication network, for example a cellular wireless mobile communication network, and a second communication unit for communicating directly with another user equipment within a transmission range of a user equipment via device-to-device communication. However, the first communication unit and the second communication unit may be implemented as a common communication unit providing both functionalities. The user equipment comprises furthermore a processing unit configured to receive a first warning indication and to determine a warning information based on the first warning indication. Furthermore, the processing unit is configured to send a second warning indication, which comprises the warning information, via the device-to-device communication to the other user equipment.

According to an embodiment, the user equipment comprises for example a mobile phone, a personal digital assistant, a mobile computer or a mobile navigation system.

Although specific features described in the above summary and the following detailed description are described in connection with specific embodiments, it is to be understood that the features of the embodiments may be combined with each other unless specifically noted otherwise. Furthermore, it is to be understood that the features of the above-described embodiments may be used independently from each other.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the invention will be described in more detail. It has to be understood that the following description is given only for the purpose of illustrating the principles of the invention is not to be taken in a limiting sense. Rather, the scope of the invention is defined only by the appended claims and is not intended to be limited by the exemplary embodiments hereinafter.

It is to be understood that the features of the various exemplary embodiments described herein may be combined with each other unless specifically noted otherwise. Furthermore, any direct coupling of functional units or components in the embodiments shown in the figures or described in the following detailed description may also be realized as an indirect coupling.

Figure 1:
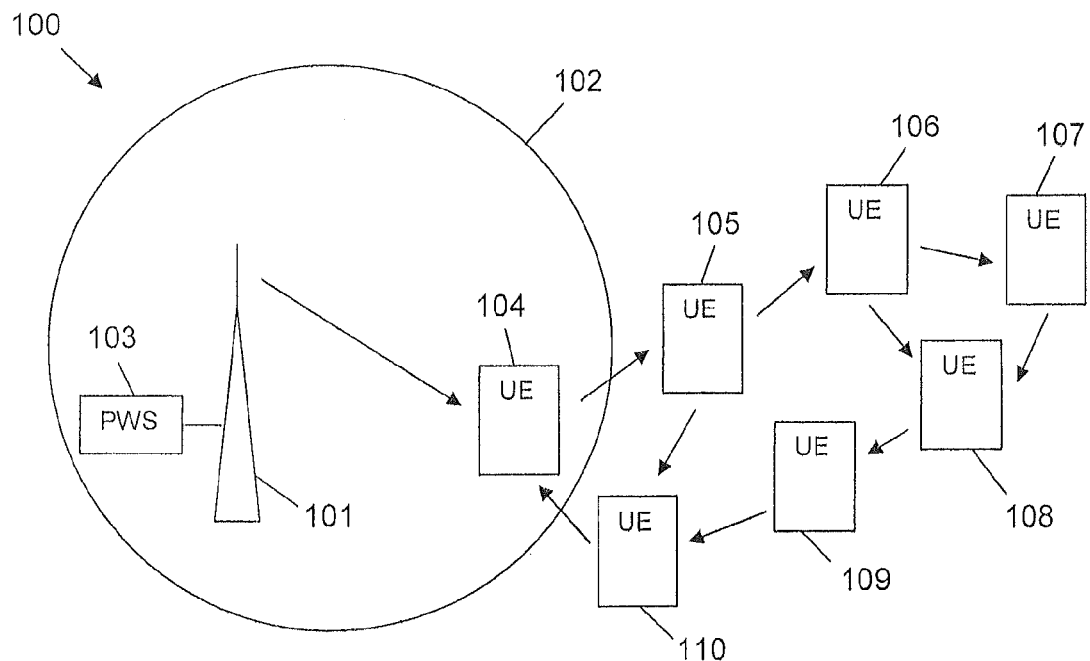
FIG. 1 shows schematically a wireless communication network in connection with a plurality of user equipments according to an embodiment of the present invention.

FIG. 1 shows schematically a wireless communication network 100. The wireless communication network 100 comprises for example a base station 101 providing a coverage indicated by the circle 102. User equipments within the coverage 102 of the base station 101 may be served by the base station 101 and user equipments located outside the coverage 102 may not be reachable and may therefore not be served by the base station 101. A public warning system PWS 103 may be coupled to the wireless communication network 100, especially for example by coupling the public warning system 103 to the base station 101 or to a (not shown) server of a control plane of the communication network 100.

FIG. 1 shows furthermore a plurality of user equipments 104 to 110. User equipment 104 is located within the coverage 102 of the wireless communication network 100, whereas user equipments 105 to 110 are located outside the coverage 102. Therefore, a direct communication between the base station 101 and the user equipment 104 is possible, whereas a direct communication between the base station 101 and the user equipments 105 to 110 is not possible. However, the user equipments 104 to 110 may provide a device-to-device communication capability as defined for example in the 3GPP standards. Therefore, as indicated by the arrows between the user equipments 104 to 110, a device-to-device communication between user equipments within a transmission range of the device-to-device communication is possible. For example, user equipment 104 may communicate via the device-to-device communication with user equipments 105 and 110. Likewise, user equipment 105 may communicate with user equipments 104, 106 and 110 via a device-to-device communication.

Figure 2:
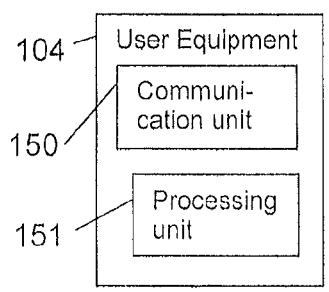
FIG. 2 shows schematically a user equipment according to an embodiment of the present invention in more detail.

Details of the user equipment 104 are shown schematically in FIG. 2. The user equipment 104 comprises a communication unit 150 for communicating with the wireless communication network 100 and for communicating directly with another user equipment within a transmission range of the user equipment 104 via a device-to-device communication. Although FIG. 2 shows a single communication unit providing both, the communication to the wireless communication network 100 and the communication to another user equipment via a device-to-device communication, the user equipment 104 may comprise two separate communication units, a first one for communicating with the wireless communication network 100 and a second one for communicating directly with another user equipment. The device-to-device communication may be facilitated by the ProSe/D2D defined in 3GPP or any other short range communication like e.g. Bluetooth or infrared. The user equipment 104 comprises furthermore a processing unit 151 for example a microprocessor or controller. The user equipment 104 may comprise a lot more components, for example a memory or storage, input and output devices like a keyboard, a touchscreen, a microphone, a loudspeaker and so on, but these additional components or not shown in FIG. 2 for clarity reasons. The processing unit 151 may be configured to perform a method 10 comprising method steps 11 to 14 shown in FIG. 3 as will be described in more detail in the following.

In case of a catastrophic situation, like e.g. a tsunami or a hurricane, the public warning system 103 may issue a warning to be distributed by the wireless communication network 100. However, due to the catastrophic situation, parts of the wireless communication network 100 may be out of order and therefore, the coverage of the wireless communication network 100 may be reduced. For example, as shown in FIG. 1 a plurality of user equipments 105 to 110 may be out of coverage 102. Therefore, in step 11, the user equipment 104 may receive a first warning indication from the base station 101. For example, the wireless communication network 100 may inform the user equipment 104 via a paging message instructing it to read system information (in LTE systems) or via a cell broadcast (in UMTS/GSM). In step 12, the user equipment 104 determines the warning information, for example by reading the system information or by extracting the warning information from a cell broadcast message. In step 13 the user equipment determines, if a forwarding of the warning information is required or allowed. This is to avoid that warning information is forwarded several times by the same user equipment resulting in loops or flooding the other user equipments with the same warning information again and again. Step 13 will be described in more detail below.

In case a forwarding of the warning information is required or allowed, the user equipment 104 sends in step 14 a second warning indication comprising the warning information to another user equipment, for example to user equipment 105. For example, if the user equipment 104 has a device-to-device connection established, it conveys the information from the public warning system to the connected device-to-device user equipment. If for example the user equipment does not have a device-to-device connection established but might be aware of a device-to-device capable user equipment in its vicinity, the user equipment may convey the public warning system information in a broadcast mode. This can be done for example by means of a one to many broadcast or by adding the public warning system information to a generic signal, for example a device-to-device synchronization signal (D2DSS).

Figure 3:
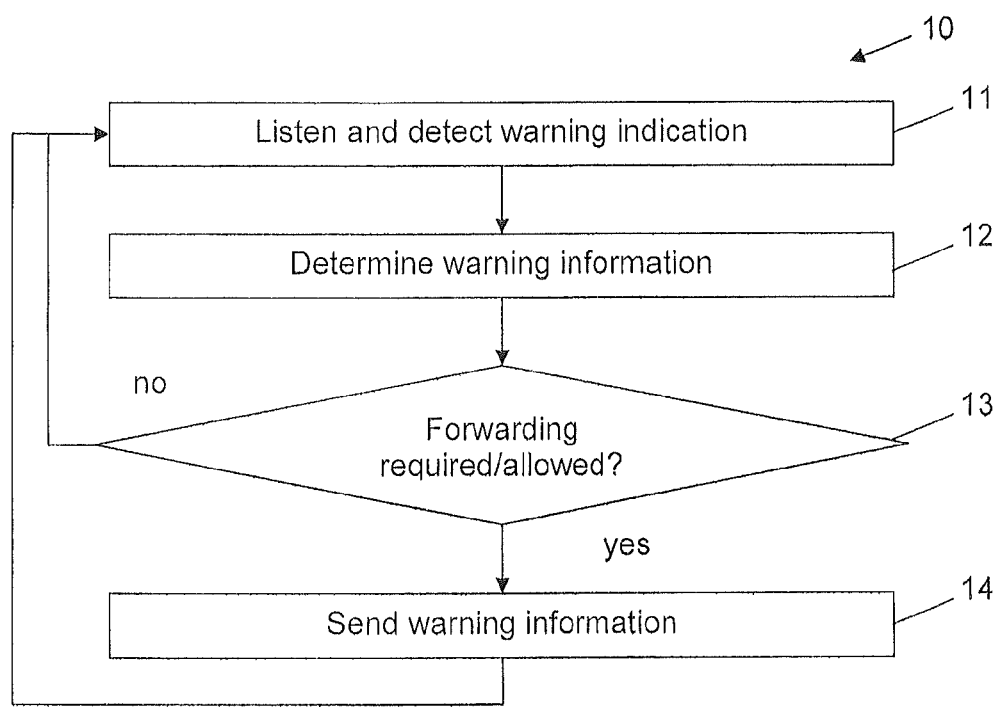
FIG. 3 shows method steps of a method according to an embodiment of the present invention.

A user equipment which is out of coverage 102 may also perform the method steps of FIG. 3 and forward the warning information to another user equipment. For example the user equipment 105 may receive the forwarded warning from user equipment 104 and may forward the warning to user equipment 106. Since other user equipments capable of a device-to-device communication and located in an out of coverage situation may be scanning for device-to-device synchronization signals in order to form a device-to-device connection, the device-to-device synchronization signal may be an appropriate signal for adding and forwarding the information of the public warning system.

To avoid that the warnings are forwarded again and again in loops via the device-to-device communication, the user equipment 104 may determine in step 13, if a further forwarding of warnings is required and allowed. For example, the relaying of public warning system information may continue for a specified period only. For example, a maximum time, a maximum amount of forwarding occasions, a restriction to relay the same warning only once or any other method controlling the amount of relaying activity may be defined. According to another embodiment, the relaying may be restricted by an IMSI (International Mobile Subscriber Identity) number of the user equipment or a user class. E.g., only user equipments having an odd IMSI number are allowed to forward the information or only specific user classes are allowed to forward the information. In case a forwarding is not required anymore or not allowed, the method is continued in step 11, as shown in FIG. 3. Otherwise the user equipment will forward or relay the warning information in step 14. This enables the public warning system information to ripple out to remote areas as long as there is a device-to-device user equipment that can receive the warning information and forward or relay the warning information.

Implementing the above-described into existing and evolving mobile network communication standards may be realized in different manners. Some of these have been mentioned above. As an alternative, for example an emergency broadcast message may be added into a device-to-device multicast signal link, for example into a one to many broadcast signalling. The same signalling information block (SIB) format for PWS messages in a device-to-device communication may be used as for cell broadcast (SIB forwarding). The device-to-device synchronization signal could indicate that an emergency broadcast message is available at a predefined timing or a new signalled timing. Furthermore, as an alternative, a new PWS relaying message may be defined for a device-to-device one to many broadcast signalling which does not require an established device-to-device communication. The PWS message format could be modified compared to the SIB format. Furthermore, as an alternative, a new PWS relaying message to be used for relaying PWS information via an established device-to-device communication may be defined. The message format could be the same as or different than the broadcasted system information blocks from the network. Specifically, it may be required to add an indicator that the data shared over the device-to-device link consists of PWS information.

It should be noted that a user equipment receiving a forwarded PWS information, for example the user equipment 105 of FIG. 1, shall act upon receiving the PWS information in the same way as a user equipment receiving the information from the network directly, like the user equipment 104 in FIG. 1.

The following technical details may be helpful in understanding the above-described implementation in present mobile communication networks according to LTE and UMTS.

In an LTE network according to 3GPP TS 36.331, a primary notification and/or a secondary notification of an earthquake and tsunami warning system (ETWS) may occur at any point in time. A paging message is used to inform ETWS capable user equipments in an idle mode and user equipments in a connected mode about the presence of the ETWS primary notification and/or ETWS secondary notification. If the user equipment receives the paging message including the ETWS indication, it shall start receiving the ETWS primary notification and/or ETWS secondary notification. The ETWS primary notification is contained in a system information block type 10 and the ETWS secondary notification is contained in a system information block type 11. Likewise, a notification of a commercial mobile alert system (CMAS) can occur at any point in time. A paging message is used to inform CMAS capable user equipments in idle and connected mode about the presence of one or more CMAS notifications. If the user equipment receives the paging message including the CMAS indication, it shall start receiving the CMAS notifications. The CMAS notification is contained in a system information block type 12.

In a universal mobile telecommunication system (UMTS according to 3GPP TS 25.311) a UMTS terrestrial radio access network (UTRAN) may indicate to send a primary notification for ETWS by including the ETWS information in a paging type 1 message. An ETWS primary notification with security procedure is used to transfer the ETWS primary notification to the user equipment. The corresponding ETWS primary notification with security message is received via a dedicated control channel (DCCH).

Finally, it is to be understood that all the embodiments described above are considered to be comprised by the present invention as it is defined by the appended claims.

What is claimed is:

1. A method for operating a user equipment in a wireless communication network, the user equipment being configured to communicate with the wireless communication network and being configured to communicate directly with another user equipment within a transmission range of the user equipment via a device-to-device communication, the method comprising: receiving, at the user equipment, a first warning indication, determining a warning information based on the first warning indication, and sending a second warning indication comprising the warning information via the device-to-device communication to the another user equipment, which is located outside of a coverage area of the wireless communication network and is configured to communicate with the wireless communication network, wherein the method further comprises: storing the warning information in the user equipment, receiving, at the user equipment, a third warning indication after having received the first warning indication, determining a further warning information based on the third warning indication, comparing the stored warning information with the further warning information, and sending a fourth warning indication comprising the further warning information via the device-to-device communication to the another user equipment based on the comparison.

2. The method of claim 1, wherein sending the second warning indication via the device-to-device communication comprises at least one of:
broadcasting the second warning indication,
multicasting the second warning indication, and transmitting the second warning indication via a device-to-device transmission connection established between the user equipment and the another user equipment.

3. The method of claim 1, wherein receiving the first warning indication comprises at least one of:
receiving the first warning indication from a public warning system of the wireless communication network, and
receiving the first warning indication via the device-to-device communication from a further user equipment.

4. The method of claim 1,
wherein the first warning indication comprises the warning information, and
wherein determining the warning information comprises extracting the warning information from the first warning indication.

5. The method of claim 1, wherein determining the warning information comprises retrieving the warning information from a public warning system of the wireless communication network separate from the first warning indication.

6. The method of claim 1, further comprising:
determining an age of the warning information, the age indicating a time period between the first time the warning information was indicated by the wireless communication network and the time the warning information was determined by the user equipment based on the first warning indication, and
sending the second warning indication via the device-to-device communication to the another user equipment based on the age.

7. The method of claim 1, wherein receiving the first warning indication comprises receiving a system information block comprising the first warning indication.

8. The method of claim 1, wherein receiving the first warning indication comprises receiving the first warning indication as a part of a synchronization signal.

9. The method of claim 1,
wherein determining a warning information based on the first warning indication comprises extracting the warning information from the first warning indication and/or retrieving the warning information via the wireless communication network separate from the first warning indication, and
wherein the second warning indication comprises the warning information that is extracted or retrieved.

10. A method for operating a user equipment in a wireless communication network, the user equipment being configured to communicate with the wireless communication network and being configured to communicate directly with another user equipment within a transmission range of the user equipment via a device-to-device communication, the method comprising: receiving, at the user equipment, a first warning indication, determining a warning information based on the first warning indication, and sending a second warning indication comprising the warning information via the device-to-device communication to the another user equipment, which is located outside of a coverage area of the wireless communication network and is configured to communicate with the wireless communication network, wherein the method further comprises: determining a hop counter value of the warning information, the hop counter value indicating a number of times the warning information has been sent via the device-to-device communication to a further user equipment, and inhibiting a further sending of the warning information depending on the hop counter value.

11. A method for operating a user equipment in a wireless communication network, the user equipment being configured to communicate with the wireless communication network and being configured to communicate directly with another user equipment within a transmission range of the user equipment via a device-to-device communication, the method comprising: receiving, at the user equipment, a first warning indication, determining a warning information based on the first warning indication, determining, if a communication connection between the user equipment and the wireless communication network is present, determining, if the first warning indication has been received via a device-to-device communication from a further user equipment, and sending a second warning indication comprising the warning information via the device-to-device communication to the another user equipment, which is located outside of a coverage area of the wireless communication network and is configured to communicate with the wireless communication network, wherein the sending the second warning indication via the device-to-device communication is inhibited if the communication connection between the user equipment and the wireless communication network is present and the first warning indication has been received from the further user equipment.

12. A user equipment, comprising: a processor, wherein the processor is configured to perform operations comprising: receiving a first warning indication, determining a warning information based on the first warning indication, and sending a second warning indication comprising the warning information via device-to-device communication to another user equipment, which is located outside of a coverage area of a wireless communication network and is configured to communicate with the wireless communication network, wherein the user equipment is configured to communicate with the wireless communication network and is located within the coverage area of the wireless communication network, and wherein the operations further comprise: storing the warning information in the user equipment, receiving, at the user equipment, a third warning indication after having received the first warning indication, determining a further warning information based on the third warning indication, comparing the stored warning information with the further warning information, and sending a fourth warning indication comprising the further warning information via the device-to-device communication to the another user equipment based on the comparison.

13. The user equipment of claim 12, wherein the user equipment comprises at least one device of a group comprising a mobile phone, a tablet computer, a personal digital assistant, a mobile computer, and a mobile navigation system.

14. The user equipment of claim 12,
wherein determining the warning information based on the first warning indication comprises extracting the warning information from the first warning indication and/or retrieving the warning information via the wireless communication network separate from the first warning indication, and
wherein the second warning indication comprises the warning information that is extracted or retrieved.

15. A user equipment, comprising: a processor, wherein the processor is configured to perform operations comprising: receiving a first warning indication, determining a warning information based on the first warning indication, and sending a second warning indication comprising the warning information via device-to-device communication to another user equipment, which is located outside of a coverage area of a wireless communication network and is configured to communicate with the wireless communication network, wherein the user equipment is configured to communicate with the wireless communication network and is located within the coverage area of the wireless communication network, and wherein the operations further comprise: determining a hop counter value of the warning information, the hop counter value indicating a number of times the warning information has been sent via the device-to-device communication to a further user equipment, and inhibiting a further sending of the warning information depending on the hop counter value.

16. A user equipment, comprising: a processor, wherein the processor is configured to perform operations comprising: receiving a first warning indication, determining a warning information based on the first warning indication, determining, if a communication connection between the user equipment and the wireless communication network is present, determining, if the first warning indication has been received via a device-to-device communication from a further user equipment, and sending a second warning indication comprising the warning information via device-to-device communication to another user equipment, which is located outside of a coverage area of a wireless communication network and is configured to communicate with the wireless communication network, wherein the sending the second warning indication via the device-to-device communication is inhibited if the communication connection between the user equipment and the wireless communication network is present and the first warning indication has been received from the further user equipment, wherein the user equipment is configured to communicate with the wireless communication network and is located within the coverage area of the wireless communication network.

* * * * *